Feb. 25, 1964 J. E. LINDBERG, JR 3,122,728
HEAT DETECTION
Filed May 25, 1959
2 Sheets-Sheet 1

INVENTOR.
JOHN E. LINDBERG, JR.
BY
ATTORNEY

Feb. 25, 1964   J. E. LINDBERG, JR   3,122,728
HEAT DETECTION
Filed May 25, 1959   2 Sheets-Sheet 2
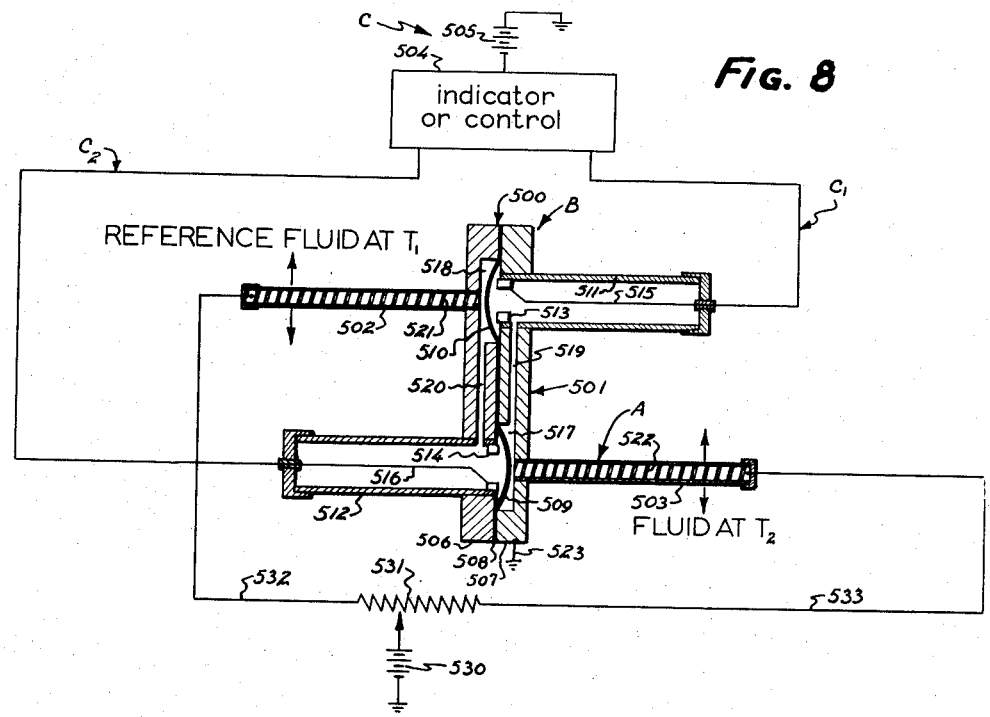
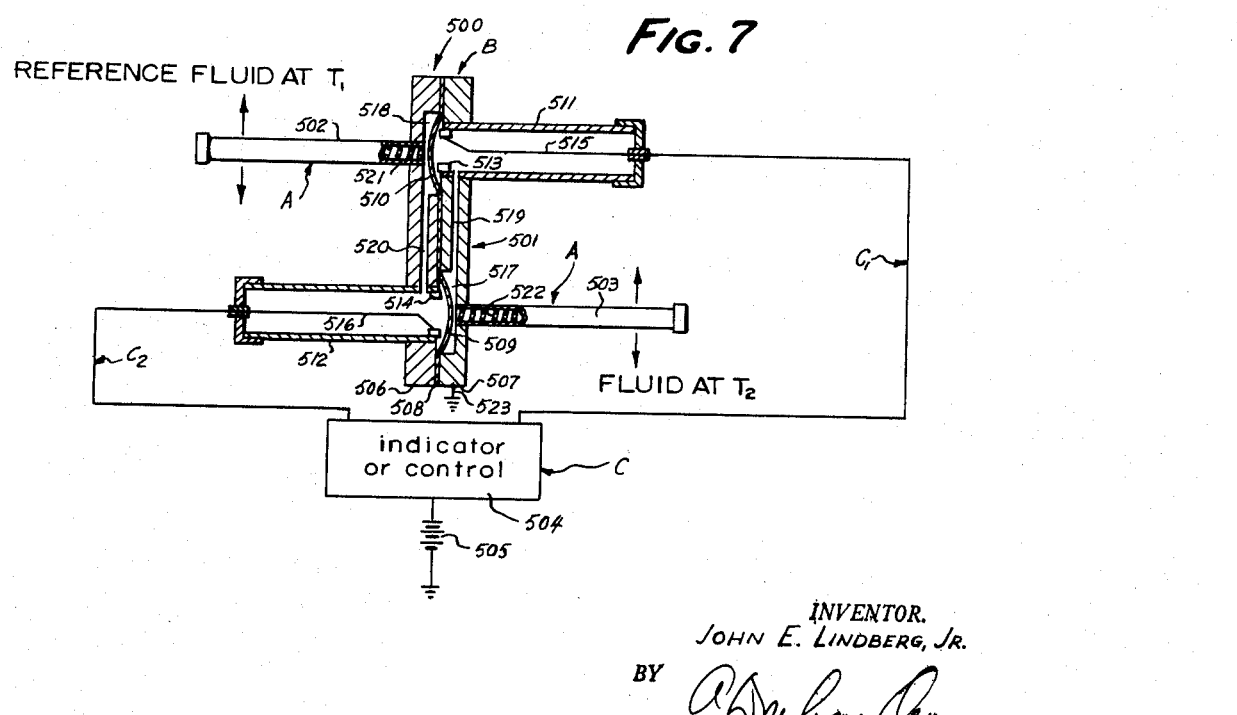
INVENTOR.
JOHN E. LINDBERG, JR.
BY
ATTORNEY United States Patent Office 3,122,728
Patented Feb. 25, 1964

3,122,728
HEAT DETECTION
John E. Lindberg, Jr., Lafayette, Calif.
(1024 Adrienne Drive, Alamo, Calif.)
Filed May 25, 1959, Ser. No. 815,406
4 Claims. (Cl. 340—229)

This invention relates to improvements in method and apparatus for heat detection.

The invention is characterized by its provision of a novel non-electric heat-detecting element or sensor able to detect at any of a wide range of critical temperatures. Only the detecting sensor need be located in the heat-detection zone, and it is connected to an electrical warning or corrective system outside the zone by a novel instrument that I term a responder. The responder may most conveniently be located outside the zone in which detection is desired, though usually close to it. The actual alarm or heat-condition indicator can be connected to the responder by a wire of practically any desired length. For example, the non-electric heat-detecting sensor may be inside a house, the responder just outside the house, and the indicator at the fire station. Or, the non-electric heat-detecting sensor may be zone 1 of an aircraft engine, ahead of a fire wall; then the responder may be behind the fire wall, and the indicator on the aircraft instrument panel.

Furthermore, the novel heat-detecting sensor may be filamentary, a long, very-narrow-diameter, hollow tube, which may extend along a line, around a circule, or along any desired path and for practically any desired length.

An outstanding feature of the invention is that the warning circuit can be operated at an impedance of less than one ohm. This feature greatly increases the reliability of the system, for this impedance is so low that complete immersion of the circuit in water does not seriously affect its operation.

A further object is to provide a temperature detector capable of indefinitely recycling to give warning each time a critical elevated temperature is reached and to withdraw the warning each time the temperature drops.

Another object is to provide a completely hermetically sealed heat-detection transducer, completely free from environmental errors caused by such things as pressure and altitude changes, moisture condensation, and so on.

Another object of this invention is to provide a system which will both: (1) detect and warn when the "average temperature" of the continuous detecting element or sensor exceeds a pre-set warning level, and (2) give overheat warning when "any small section" exceeds a chosen higher temperature, and (3) give a fire warning when "any section" of the transducer exceeds the fire temperature, e.g., 1500° F. or above.

An additional object is to provide a device capable of indicating average temperatures in two well-defined temperature ranges. Further, sharp changes in the pressure-temperature response characteristics, which occur at the transition point between these two ranges, may be utilized to indicate certain temperature conditions.

A further object is to provide apparatus for detecting two different average temperatures with a single instrument.

Another object is to provide a differential temperature indicator.

Other objects and advantages of the invention will appear from the following description of several preferred embodiments thereof.

In the drawings:

FIG. 7 is a view, partly in elevation and in section and partly diagrammatic, of a differential temperature indicator embodying the prinicples of the invention.

FIG. 8 is a view similar to FIG. 7, of a further modification of that device.

GENERAL STATEMENT OF THE INVENTION

Figure 1:
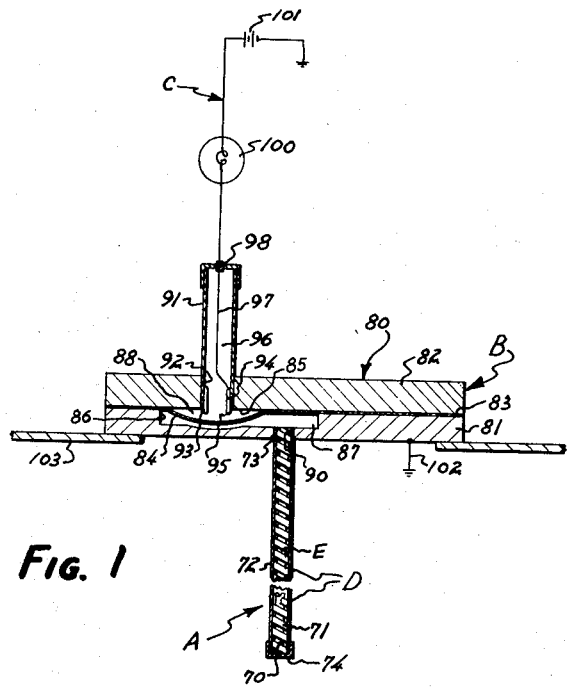
FIG. 1 is an enlarged view in elevation and in section of a simplified form of temperature detection system, showing the responder and a heat-detection sensor, broken in the middle to conserve space. The electrical circuit is shown diagrammatically.

As shown in FIG. 1, the temperature detection system of this invention comprises (1) a non-electric detection means, preferably in the form of a generally filamentary senor A, (2) a responder B, and (3) an electrical circuit C. The sensor A is made of indeterminate length and does not include any element of the electrical circuit C or any other electrical circuit. Its function is to actuate the responder B, and the function of the responder B is to actuate the electrical circuit C in response to predetermined conditions of temperature obtaining in the environment within which the sensor A is located. Thus, the sensor A and the responder B, considered together, comprise a transducer.

The sensor A may be further defined in general terms (see FIGS. 1-5) as a generally filamentary enclosure D of extended length connected to the responder B and containing means E responsive to heat in the environment of the sensor A, for raising the pressure in the responder B.

The responder B may be thought of as typically a pressure-actuated electrical switch that opens or closes the electrical circuit C in response to pressure changes induced by the sensor A as it responds to heat.

The electrical circuit C may be a warning circuit or a remedial circiut. Several responders B may be used in one circuit, if desired, to control it in some manner that depends on the temperature conditions of the environments to which the sensors A are exposed.

DETAILED DESCRIPTION OF SOME PREFERRED
FORMS OF THE SYSTEM AND ITS COMPONENTS (1) *The Sensor A*

The temperature detector of this invention includes a novel detecting means or sensor A. The sensor A has an enclosure D, preferably comprising a narrow-diameter metal tube of constant cross-sectional area and of any desired length. Within this enclosure D is means E responsive to the temperature of the enclosure D for varying the pressure inside the enclosure D. This means E may also be referred to as a transducing agent or as a gas-emitting agent. The enclosure D is gas-tight and its only opening is connected to the responder B, which itself defines a closed chamber connected to the enclosure D. An alteration of the internal pressure within the enclosure D therefore affects the responder B.

(*a*)—*The transducing agent E.*—This invention depends, in most aspects, upon the ability of certain classes of substances herein called transducing agents E, to release or emit large volumes of gases or vapors when elevated to a temperature sought to be detected. When these materials are enclosed in a constant-volume container D and subjected to temperature changes, the resultant alteration of pressure within this container D is employed to actuate the responder B to close or open a warning system C.

Several basic types of materials are suitable transducing agents E: (1) materials that retain gas at low temperatures and emit gas progressively over a wide range of elevated temperatures; and (2 materials that retain relatively small quantities of gas at low temperatures and absorb large quantities of gas as the temperature is elevated over a wide range.

Although these two types of materials and their characteristic phenomena have been observed for many years, about the only practical applications of them heretofore have been in the vacuum tube industry to take up residual gases in the tube after sealing.

Class (1) above includes heat-dissociable materials such as the alkaline and alkaline earth hydrides, the hydrides of certain metals, listed below, and some borohydrides. These materials, when subjected to an increase in temperature, emit gas and therefore may be employed as a means for altering the internal pressure of a container D in which they are enclosed. With the alkali and alkaline earth metals, i.e., groups I–a and II–a of the periodic table, hydrogen forms stoichiometric compounds such as sodium hydride and calcium hydride. These are ionic in behaviour, with hydrogen as the negative ion. The reactions are reversible and exothermic and are useful in this invention. Specifically, hydrogen reacts with lithium, sodium, potassium, rubidium, cesium, calcium, radium, strontium, francium, and barium, in stoichiometric proportions to form hydrides.

Hydrogen reacts with aluminum to form aluminum hydride and complex alumino hydrides such as lithium alumino hydride, magnesium alumino hydride, and sodium alumino hydride.

With the elements of groups III–a (including the rare earth and actinide elements), IV–a, V–a, hydrogen forms pseudo-hydrides. The solubility of hydrogen in elements of these groups varies as the square root of the pressure, and it decreases with increase in temperature. Above about 300° C., palladium also behaves in this way. Elements of these groups are designated as "group B," the class consisting of scandium, titanium, vanadium, ytterbium, zirconium, niobium, hafnium, tantalum, the rare earth metals (atomic numbers 57 through 71), and the actinide meals (atomic numbers 89 through 103); palladium is a member of this group at temperatures greater than about 300° C. This solution is commonly termed a "hydride," though it is not a stoichiometric compound. Examples of the sorptive capacities as a function of temperature of some materials chosen from the hydrides of group B are given in Table I.

TABLE I.—SORPTION OF HYDROGEN BY TYPICAL METALS OF GROUP B

[In cm.$^3$ (S.T.P.) per gm., at 1 atm.]

| Temperature, ° C. | Titanium | Vanadium | Zirconium |
|---|---|---|---|
| 20 | 407.4 | 150 | 235.5 |
| 400 | 387.7 | 38 | |
| 600 | 334.7 | 10 | 184 |
| 800 | 140.9 | 4.4 | 165 |
| 1,000 | 66.1 | 2.5 | 78 |

A suitable, but not necessarily preferable, transducing agent of type (1) above is charcoal, which has for many years been commonly used for sorbing gases. Charcoal, especially in its activated form, will adsorb large amounts of gas reversibly. For illustration, Table II gives the solubility of typical gases in charcoal.

TABLE II.—ADSORPTION OF GASES BY CHARCOAL

[Volume of gas per gram adsorbent, adsorbed at 15° C. and 760 mm. pressure]

Gas: Vol. adsorbed in cm.$^3$
 $COCl_2$ _____ 440
 $NH_3$ _____ 181
 $O_2$ _____ 8
 $H_2$ _____ 5

Several zeolites exhibit marked capacities for sorption and desorption. Illustrations of some typical solubilities of hydrogen and carbon dioxide in dehydrated chabasite, a form of zeolite, are shown in Table III.

TABLE III.—SORPTION OF HYDROGEN AND CARBON DIOXIDE

[By dehydrated chabasite at 0° C. and 760 mm.]

| $H_2$ | | | $CO_2$ | | |
|---|---|---|---|---|---|
| T, ° C. | D | $V_o$ | T, ° C. | D | $V_o$ |
| 180 | 61.4 | 0.1 | 120 | 33.2 | 33 |
| 380 | 91.3 | 1.0 | 390 | 90.7 | 128 |
| 640 | 97.5 | 2.7 | 635 | 96.3 | 115 |

Where:
 D=percentage of dehydration, and
 $V_o$=amount occluded in cm.$^3$/gm. at standard temperture and pressure.

All these are merely example of class (1) materials as defined above, and do not by any means exhaust the list. For the purposes of this invention, however, they do exemplify the materials that retain gas at low temperatures and emit gas progressively as the temperature is raised.

Class (2) materials, in contrast to those of class (1), absorb gas when subjected to a temperature elevation. They also may be employed to alter the internal pressure of a container in which they are enclosed. For example, hydrogen interacts with what are known as the "group A metals," consisting of copper, silver, molybdenum, tungsten, iron, cobalt, nickel, aluminum, platinum, manganese, technetium, rhenium, osmium, iridium, ruthenium, and rhodium; chromium is a member of this group at temperatures greater than about 300° C. The action appears to be a type of solubility, and the solubility increases with increasing temperature. Certain borohydrides also behave in this manner. Examples of the sorptive capacities of typical class A materials are illustrated in Table IV.

TABLE IV.—SORPTION OF HYDROGEN BY TYPICAL METALS OF GROUP A

[In cm.$^3$ (S.T.P.) per 100 gms., at 1 atm.]

| Temperature, ° C. | Nickel | Copper | Chromium |
|---|---|---|---|
| 200 | 1.70 | | |
| 400 | 3.15 | 0.06 | |
| 600 | 5.25 | 0.30 | 0.5 |
| 1,000 | 9.80 | 1.58 | 3.0 |

Oxygen also reacts similarly with some metals, but in many cases it is difficult to distinguish between solution of oxygen and solution of oxides. However, the formation of true solutions has been determined in silver, copper, cobalt, and a few other metals. Examples of the solubility of oxygen in silver and copper are listed in Tables V and VI.

TABLE V.—SOLUBILITY OF OXYGEN IN SILVER AT 1 ATM. PRESSURE

T ° C. Cm.$^3$/100 g.
 400 _____ 0.83
 600 _____ 1.26
 800 _____ 3.37

TABLE VI.—SOLUBILITY OF OXYGEN IN COPPER AT 1 ATM. PRESSURE

| T., °C: | Cm.³/100 g. |
|---|---|
| 600 | 5.0 |
| 800 | 6.6 |
| 1050 | 11.0 |

Many other examples may be cited of gases dissolving in metals. The omission of others is not intended to exclude them from this invention.

With materials of this invention, the process of sorption and desorption is reversible. Thus a sample of such material may be subjected to the sorption and desorption process for an indefinite number of repetitive cycles.

The materials of this invention, as explained previously, when located within a closed chamber, provide an effective means of altering the internal pressure of the chamber. This internal pressure, as explained in my copending application Serial Number 759,717, filed September 8, 1958, is a function of the temperature applied to the material. In general, there exists a one-to-one correspondence between this pressure and the temperature. Thus, the enclosed material functions as an element which effectively converts temperature variations into pressure variations and that is why the general class of materials is referred to herein as transducing agents.

(b) *Typical sensor structures.*—FIGS. 2–5 illustrate a few of the many ways in which the sensor A may be constructed. Transducing agents E may be used in a filamentary, pellet, or granular form, always being placed inside the sensor tube D which may be a non-porous tube of constant cross-sectional area. In applications where the tubes D are to be bent or curved around corners, metal is the preferred material. Suitable metals are pure iron, which is impermeable to many gases, stainless steel, and molybdenum, for example. In applications where bending is not required and minimum diffusion is desired, the tube D is preferably made from non-porous quartz, ceramic, or special glass. In any event, the inner surface of the tube D should not react with the materials it contacts, including the gas involved. Where the tube D is reactive with the transducing agent E, a special problem is created, which I solve as described below. A typical sensor tube D is preferably about 0.040" to 0.060" outside diameter with a wall thickness of preferably about 0.005" to 0.015". Such tubes D are preferably about two to twenty feet long, although they may be longer or shorter.

Figure 2:
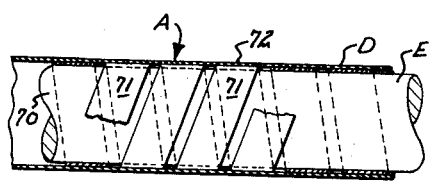
FIG. 2 is a greatly enlarged view in elevation and in section of a portion of one preferred form of a heat-detection sensor of this invention.

FIG. 2 shows a preferred form of transducing agent E enclosed in the sensor tube D. Here the transducing agent E is a filament 70, such as zirconium wire for group B operation or copper wire for group A operation, and may be about 0.025" to 0.050" in diameter, for example. A ribbon 71 of suitable material, such as molybdenum, preferably about 0.020" wide and 0.002" thick, is wrapped tightly around the filamentary transducing agent 70 and fits snugly within the tube D. The ribbon 71 physically spaces the filament 70 from the walls 72 of the tube D and prevents the transducing agent 70 from fusing or welding to the tube walls 72, even in the event that the sensor A is exposed to extreme heat.

As a simplified example of installation of the sensor A of FIG. 2 to the responder B, one end 73 (FIG. 1) of the tube D may be connected by a gas-tight seal to the responder B, while the other end 74 of the tube D is still open. This free end 74 may be connected to a vacuum pump and the tube D pumped free of gas. Then the tube D is heated, and then pure hydrogen is forced in through the free end 74, the zirconium filament 70 absorbing the hydrogen while it cools. When group A material is used, hydrogen may be pumped into the tube D while the wire 70 is heated, thus ingassing it at an elevated temperature. In either event, the originally pure metal 70 is converted into an ingassed hydride. The free end 74 is then sealed off, and the device is ready for operation.

Figure 3:
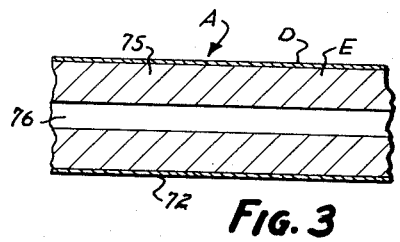
FIG. 3 is a view similar to FIG. 2, of a modified form of sensor, also embodying the principles of the invention.

In the sensor A of FIG. 3, the transducing agent E may consist of powdered hydride molded or pressed into the form of a tube 75. Hydride may be held in this form by using a suitable binder, which may be hydrolized ethyl silicate. The hole 76 which extends axially along the length of the tube 75 serves as the free volume space through which evolved gas may flow. The tube 75 is fitted snugly into the tube D, the tube-end 73 connected to the responder B, the tube D processed as described above or as desired, and the end 74 sealed.

Figure 4:
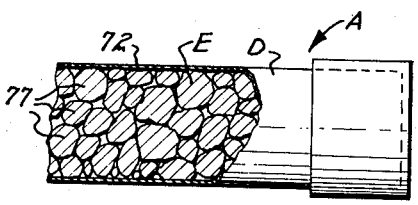
FIG. 4 is a view similar to FIG. 2 of another modified form of sensor.

The transducing agent E may be used in the form of a series of discrete pellets 77 as shown in FIG. 4. The pellets 77 may be formed by molding or by dispersing powdered hydride, for example, in a binder such as hydrolyzed ethyl silicate and compressing the mixture into pellet form. The pellets 77 are made slightly smaller than the inside diameter of the tube wall 72 to allow passage of gas evolved from the pellets 77.

Figure 5:
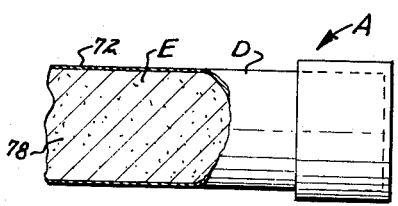
FIG. 5 is a view similar to FIG. 2, of still another modified form of sensor.

In FIG. 5 the transducing agent E comprises a series of small granules 78 within the tube D. These granules may be number 40 or 70 grit size of titanium hydride or zirconium hydride, for example.

Although only a few specific forms for the agent E have been illustrated or described, many others are possible, and it is intended that their omission not be in any sense limiting or restrictive to the possible application and construction of this invention.

Thus, the combination of the tube D and the transducer agent E functions as the heat-sensitive element or sensor A in this fire detector.

In FIG. 1, the sensor A may contain a hydride of group B, such as zirconium hydride. At ordinary temperatures this compound will retain its hydrogen until it is heated to or above a certain threshold temperature. At such a threshold temperature, degassing of the compound will begin to occur, during which some of the hydrogen will be emitted and liberated as a gas, thereby increasing the pressure inside the tube D. As stated earlier, one end 74 of the sensor A is sealed while a pressure-sensitive switch or responder B is sealed to the tube D at the other end. Let us now consider the responder B.

(2) *A simple form of responder B (FIG. 1)*

Any pressure switch that is properly sensitive and has the needed connections may be used as a responder B. However, I have invented a new pressure switch that is especially suitable for use herein.

FIG. 1 shows a simple form of responder B, suitable for simple installations. This responder B comprises a unit 80 and has two circular plates 81 and 82, preferably of non-porous metal, between which is bonded (as by brazing) a thin metal flexible disc or diaphragm 83. The plates 81 and 82 are hermetically sealed together and are in electrical contact for their full peripheries and over a substantial margin, but in the center the diaphragm 83 has a spherical depression 84 called a "blister," which is free to move relative to the plates 81 and 82 and constitutes the active or movable part of the diaphragm 83. Use of a diaphragm with a blister 84 makes possible the use of an upper plate 82 with a planar lower surface 85 and gives a more predictable response, but other diaphragm structures may be used where feasible. The lower plate 81 is formed with a recess 86 in its upper surface, and the diaphragm 83 divides the resultant cavity between the plates into two regions or chambers 87 and 88. Since the lower region 87 communicates with the sensor A, it may be called the "sensor chamber." The other region 88 is located on the opposite side of the diaphragm 83 from the sensor A; so it may be called the "anti-sensor chamber." Of course, either plate 81 or 82 may actually be made by brazing together several thin plates of the desired configuration, and the recess 86 may be provided by using a stack of preformed thin washers over a disc. A preferred material for all the metal elements in the responder 80 is molybdenum.

The end 73 of the sensor tube D is joined to and sealed to the lower plate 81, fitting within a hole 90. The region 87 is closed and sealed except for its communication with the lumen of the sensor tube D; so the inside of the sensor A and the sensor chamber 87 enjoy a common atmosphere to the exclusion of any other.

A tube 91 of non-porous ceramic material or other non-porous electrically-insulating material extends through an opening 92 in the upper plate 82 and is hermetically sealed in place there with its lower end 93 flush with the bottom surface 85 of the plate 82. The hole 92 and tube 91 are preferably centered with respect to the blister 84, on the anti-sensor side thereof. A metal electrode 94 is located inside and joined securely to the tube 91 at the end 93 nearest the blister 84, with a portion 95 of the electrode 94 extending below the lower surface 85 of the plate 82. The amount by which the portion 95 extends below the surface 85 is carefully controlled so as to be uniform in each responder of any particular design. This geometry means that the blister 84 can make electrical contact with the electrode portion 95 when the blister 84 is forced up by pressure in the sensor chamber 87. As shown, the electrode 94 may be annular to give good uniform contact with the blister 84 at that time and also to afford communication between the chamber 88 and the inside 96 of the tube 91. A conducting wire 97 extends from the electrode 94, preferably along the axis of the tube 91 and is brought out of the tube 91 through a hermetic seal at a sealing cap 98. The tube interior 96 and the anti-sensor chamber 88 thus enjoy a common atmosphere to the exclusion of any other.

If sufficient pressure is applied to the sensor side of the blister 84, it will deflect and make contact with the electrode portion 95, and if the deflecting force is removed the restoring force of the blister 84 will return it to its relaxed position and thus break contact with the electrode portion 95. The force necessary to do this may be chosen by proper design of the blister to accommodate a wide range of values.

(3) *A Simple Circuit C and its Operation (FIG. 1)*

As explained before, the responder B may be connected to an alarm circuit which, as shown in FIG. 1, is a simple visual indicator consisting of a lamp 100 in series with the conducting wire 97 and a source 101 of electrical current, which may be a battery as shown or may be a source of alternating current. A return path for the electrical circuit C may be provided by grounding either one of the plates 81 or 82 and is shown as a ground wire 102 in FIG. 1.

In operation, when the sensor A is exposed to heat at a level high enough to cause the transducing agent E to rise above its threshold temperature, gas is emitted. This gas cannot escape from the sensor tube D except into the sensor chamber 87, where it exerts pressure upon the blister 84. This pressure tends to move the blister 84 away from the plate 81 and toward the plate 82. The pressure in the sensor chamber 87 is a function of the temperature of the sensor A, and in general there will be a one-to-one correspondence between the temperature of the sensor A and the pressure with the sensor chamber 87. This pressure, if great enough, will cause the blister 84 to make contact with the electrode 94, but no contact will be made unless the temperature of the sensor A is at or above a definite level.

When the sensor A is exposed to heat at a level high enough to cause the blister 84 to make contact with the electrode 94, current flows from the battery 101 through the lamp 100, the conductor 97, the electrode 94, and the blister 84 to the plates 81 and 82 and returns to the battery 101 through ground line 102. This current flow causes the lamp 100 to light and provides a visual indication that the temperature of the sensor A is at or above a certain level. In this sense, the device shown in FIG. 1 functions as a threshold temperature indicator. When heat is removed from the sensor A, the transducing agent E cools and reabsorbs its previously emitted gas, resulting in reduction of the pressure exerted upon the blister 84. The blister 84 moves away from the electrode 94, breaking the electrical circuit, and the lamp 100 goes out.

In practice, the sensor A is placed in the area whose temperature is to be monitored, while the responder B may be located upon or behind a shielded wall 103 or at some easily accessible area. Thus only the sensor A itself need be exposed to possible heat sources, and it contains no element of the electrical circuit. In this manner, protection for the responder B and its associated alarm circuit C may be provided.

(4) *Some Ways of Setting the Theshold Temperature (FIG. 1)*

The force necessary to deflect the blister 84 against the electrode 94 can be chosen to accommodate a wide range of values by a suitable choice of mechanical parameters. Once this force is determined, the dimensions of the sensor tube D and the amount of transducing agent E may be chosen by design to provide the force necessary to obtain contact between the blister 84 and electrodes 94 at a certain temperature.

In addition to mechanical design considerations, the necessary deflecting force may also be altered by precharging the anti-sensor chamber 88 with a gas under pressure or by partially evacuating it. To accomplish this, gas is forced into (or withdrawn from) the tube 91 after its attachment to the plate 82 and before it is closed by its cap 98. The required deflecting pressure against the blister 84 becomes greater as more gas is present in the chamber 88.

Alternatively, the deflecting pressure may be effectively lowered by precharging the inside of the sensor tube D and the sensor chamber 87 with gas. In this case, if the ambient pressure in the sensor chamber 87 is greater than normal, less than normal gaseous elaboration from the transducing agent E is required to deflect the blister 84 against the electrode 94.

Most gases may be employed for this purpose; however, ideally the gas should not react chemically with its surrounding materials. Particularly suitable are the inert gases, such as helium, argon, neon, and xenon, especially since they do not readily diffuse through most materials. As a consequence, a precharged pressure of argon, for example, may be maintained for an indefinite length of time to retain a desired biasing of the diaphragm 83, as described.

Figure 6:
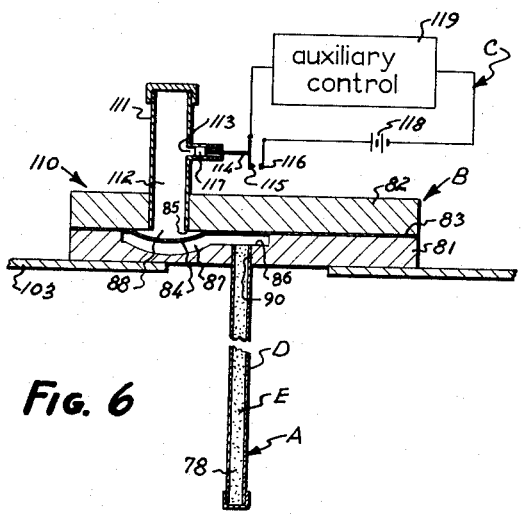
FIG. 6 is a view similar to FIG. 1, showing a somewhat different responder structure in conjunction with a different type of connection to a different electrical circuit.

(5). *A Modified Form of Simple Responder B and its Modified Circuit C. (FIG. 6)*

The responder B may also be so used that the variations in pressure occurring on the anti-sensor side of the diaphragm 83 will act indirectly on an auxiliary pressure switch. In this case, the blister 84 does not close against an electrode. In the unit 110 shown in FIG. 6 there is no electrode, but a ceramic tube 111 is inserted in the responder 110 as before with its interior 112 in direct communication with the anti-sensor chamber 88 and, also, via an arm 113 of the tube 111, with a conventional type of pressure switch 114. This switch 114 may be, for example, one whose contacts 115 and 116 close when pressure is applied to a piston 117.

Thus, when the sensor A is heated, the diaphragm blister 84 is deflected toward the ceramic tube 111 and causes an increase of pressure in the anti-sensor chamber 88 and tube interior 112, which in turn is communicated to the pressure switch 114. At the selected pressure, the contacts 115 and 116 of the pressure switch 114 close, and current flows from a battery 118 through an auxiliary control 119. This control 119 may be a lamp like the lamp 100, or it may be a device to perform any other suitable function, such as, for example, to operate a fire extinguisher. (Of course, the lamp 100 in FIG. 1 may also be replaced by such a control 119.) When the temperature of the sensor A falls below a certain value, the blister 84 re-deflects toward the sensor A to its normal position and decreases the pressure within the ceramic tube 111, thereby deactivating and opening the pressure switch 114. The auxiliary control 119 then ceases to function.

Alternatively, the pressure switch 114 may be such that its contacts 115 and 116 are normally closed. Then when the pressure in the interior 112 of the ceramic tube 111 is increased beyond a certain value, the applied pressure to the switch 114 opens its contacts 115 and 116. This action may be used to perform various suitable functions. For example, it may function as a thermostat. It also enables the use of type (2) transducing agent, such as copper hydride, which ingasses as the temperature rises and outgasses when the temperature drops.

*Pre-conditioning of the test element.*—When most metal hydrides are purchased, it will generally be found that they are over-charged with hydrogen. Also, metallic hydrides are partly electrically conductive, and their conductivity changes with temperature. At high voltages or at high temperatures, the hydride may short-circuit the filament. Therefore, more consistent and more accurate results are obtained by pre-conditioning the hydride.

One way of solving the electrical resistance problem just stated is to electrically insulate the hydride particles at all times, without inhibiting the passage of gas to or from the hydride. A unique way of accomplishing this is to intimately mix hydride particles with an insulating material such as powdered alumina or quartz. The particles of insulating material may be the same size as the hydride particles, or smaller, down to microscopic size. In the construction of test units, it was determined that ball-milling a mix of either microscopic or particulate alumina and titanium hydride in equal parts by weight for several days produced a very satisfactory result. Test assemblies employing filaments of 0.002" diameter tungsten wire embedded in this mix have withstood cyclic and continuous operation for periods of several hours without mechanical or electrical failure and without noticeable change in operating characteristics.

Additional advantages derived from the use of the hydride-insulator mix are that much less filament current is required to cause a given amount of gaseous elaboration than is necessary when unprepared hydride is used, indicating an increase in the energy transfer efficiency.

(6). *The Behavior of Various Transducing Agents E*

The operation of the illustrated systems has heretofore been described mainly with reference to group B hydrides as the transducing agents. However, all these systems will also function with any of the other transducing agents previously described. Which one is to be preferred depends on the purpose to be served.

Class (2) materials elaborate gas when the temperature is "lowered." Suppose, for example, that nickel hydride were used as the transducing agent E. The apparatus of FIG. 1 may be made so that the blister 84 is in its relaxed position when the sensor A is exposed to a temperature of 600° C. Then, if the temperature at the sensor A is lowered to, say 200° C., hydrogen will be emitted from the nickel hydride and deflect the diaphragm 84 against the electrode 94, energizing the alarm circuit C. In this case, the illumination of the lamp 100 indicates that the temperature in the area to which the sensor A is exposed is at or below 200° C. The reaction is reversible; so when the sensor A is again heated to 600° C., the nickel hydride reabsorbs its previously emitted hydrogen and the diaphragm 84 returns to its relaxed position, deenergizing the alarm circuit C. In this example the device was employed to indicate a temperature drop, but it will be apparent that it can be used to indicate temperature elevation as well by having the warning actuated by a circuit break instead of a circuit make. This technique is well known and need not be described in detail.

*Average temperature indication versus spot temperatures.*—The heat-detecting apparatus of this invention as so far described indicates the average temperature to which the sensor A is exposed. The sensor A is not usually exposed to the same temperature uniformly along the tube D; the high temperatures usually affect only certain localized regions of the tube D, while the remaining regions are at a lower temperature.

The material used in this invention outgas and ingas reversibly. As a result, gas emitted by localized heating of the sensor A may be reabsorbed in the cooler portions of the sensor. For example, if a tube D containing a class (1) agent E is locally heated, the resulting increase of pressure disturbs the equilibrium conditions around the material in the cooler portions of the tube D and some ingassing takes place there. This counteractivity does not, however, mean that the average pressure in the tube is the same as it was before any heating was applied. Actually, if the transducing agent E is fully ingassed, the average pressure is elevated by this process, and the responder B thus responds to the average pressure in the tube. This, in turn, means that the alarm circuit C still indicates the average temperature to which the sensor A is exposed. For example, if half of the tube is exposed to a temperature of 850° C. and the remaining half is exposed to 750° C., the response of the alarm circuit C will indicate that the average temperature is approximately 800° C.

The heat-detecting apparatus of this invention may be made to operate effectively over two distinct ranges of average temperature indication. This type of operation enables a unique determination of any preselected temperature occurring above a certain value.

One range of average-temperature response is that in which the transducer agent E takes in or emits gas freely. This response has already been described and applies only above the threshold temperatures of the material.

The other range of average temperature operation is below the threshold temperature of the particular transducing agent E involved. Class B hydrides, for example, do not emit gas until a certain temperature-pressure condition is reached.

The threshold point is therefore the meeting point of the two ranges. Below the threshold point, the gas in the sensor A surrounding the transducing agent E behaves very nearly as an ideal gas obeying the well-known laws of gases. The volume remaining constant, an increase in temperature results in an increase in pressure. At various points along the sensor A the temperature may vary, and the pressure in the tube D results from the total effect of the incremental expansions at each incremental portion of the tube along its length. The sensor A has a constant cross section and encloses almost all the volume on the sensor side of the blister 84 (FIG. 1), which is very nearly constant, since the change in volume due to diaphragm movement is negligible. Hence the pressure in the tube D averages out the variations in temperature, and the responder B is actuated by the "average" temperature to which the sensor A is exposed. Below the threshold point the relation between the average temperature applied to the sensor A and the resulting internal pressure is very nearly linear, having a rather gentle slope.

When the temperature of the sensor A reaches the threshold point, the transducing agent E emits gas. Since, at the threshold point, the transducing agent E is fully ingassed, local heating at or above the threshold point elaborates gas which is not reabsorbed by the remaining cooler portion. As a result, there is a sharp increase in the rate of change of pressure, with respect to temperature, in the tube D, and a discontinuity in the slope of the curve occurs. The new slope represents a linear relation between pressure and temperature and, in fact, the relationship is very nearly linear over a wide range of conditions above the threshold point, for as the average temperature is elevated above the threshold point, the transducing agent E is no longer fully ingassed, and the device again functions as an average temperature indicator, but with a steeper slope.

The threshold point is uniquely determined by the type of transducing agent E employed, together with the initial pressure of gas in equilibrium with the agent E and the mechanical design of the system. A wide range of threshold points may thus be availed of by proper design.

As explained earlier, the gas surrounding the transducing agent E below the threshold point may either be the gas which is taken up or released by the agent or may be an inert gas. The inert gases are preferable, since they are less likely to be lost by diffusion through the tube D, than is hydrogen. Also, inert gases do not affect the degree of ingassing of the transducing agent E.

Sharper detection of the threshold point is obtained by eliminating the inert gas and operating the agent E under vacuum conditions, thereby making it possible to detect a threshold temperature applied to only a short length of the tube D. As before, choice of the agent E, its degree of ingassing, and the sensitivity of the responder B may be varied to change the threshold point. Alloys of agents E may be used.

*(7). Differential Temperature Indication (FIGS. 7 and 8)*

(a) *A two-sensor indicator (FIG. 7).*—FIG. 7 shows a differential temperature indicator 500 employing a modified form of responder 501, two sensors 502 and 503, an indicator or control device 504, and a current source 505. The responder 501 comprises two plates 506 and 507, a diaphragm 508 with two blisters 509 and 510, and two tubes 511 and 512 of insulating material. Contacts 513 and 514 are connected by respective wire leads 515 and 516 to the indicator or control 504. The convex sides of the blisters 509 and 510 are on opposite sides of the diaphragm 508 and serve to separate the interior of the responder 501 into two gas-tight chambers 517 and 518. The chamber 517 includes the interior of the sensor 503, a small duct 519, and the interior of the tube 511; the chamber 518 includes the interior of the sensor 502, a small duct 520, and the interior of the tube 512. Each sensor 502, 503 contains a transducing agent 521, 522, such as zirconium hydride wrapped with molybdenum ribbon. The electric circuit is completed by a ground connection 523 of the responder 501.

The sensors 502 and 503 may be exposed to environments whose temperatures it is desired to compare. Emission of gas by the transducing agent 522 in the sensor 503 increases the pressure in the chamber 517 and tends to cause the blister 509 to move toward the contact 514 and the blister 510 to move away from the contact 513. Emission of gas by the transducing agent 521 in the sensor 502 tends to have the opposite effect by increasing the pressure in the chamber 518.

The responder 501, and particularly the diaphragm 508, may be designed so that both blisters 509 and 510 touch their contacts 514 and 513 only at a certain well-defined pressure difference between the chambers 517 and 518. If the pressure in the chamber 518 is too high, the blister 509 will move away from its contact 514; if too low, the lister 510 will move away from its contact 513. The pressure difference at which both blisters 509 and 510 touch their contacts 514 and 513 can be chosen from a wide range by design of the components. The condition in which both blisters 509 and 510 touch their contacts 514, 513 may be called the "null condition."

Since the pressures in the chambers 517 and 518 depend upon the temperatures of the sensors 503 and 502, the difference between the pressures in the chambers 517 and 518 depends upon the difference between the temperatures of the sensors 503 and 502. Over the linear ranges of the transducers' pressure-temperature curve, $$P_1 = a_1 + bT_1$$
$$P_2 = a_2 + bT_2$$

where $P_1$ is the pressure in the chamber 518,
$P_2$ is the pressure in the chamber 517,
$T_1$ is the temperature of the sensor 502,
$T_2$ is the temperature of the sensor 503, and
$a_1$, $a_2$, and $b$ are constants which depend upon the initial pressures in the chambers 517 and 518 and on the transducing agents 521 and 522.

Subtracting the first of these equations from the second gives the result $$(P_2 - P_1) = (a_2 - a_1) + b(T_2 - T_1)_1$$

or, defining $(P_2 - P_1) = \Delta P$, $(T_2 - T_1) = \Delta T$, and $(a_2 - a_1) = A$, $\Delta P = A + b \Delta T$. Therefore, if it is desired that the null condition of the responder 501 occur at a particular temperature difference $\Delta T_0$ between the sensors 502 and 503, the above equation gives the value of $\Delta P_0$ for which the responder should be designed to be in the null condition. To achieve $\Delta P_0$, the blisters 509 and 510 can be made more sensitive or less sensitive by changing their diameter, thickness, and concavity, and the initial pressures in the chambers 517 and 518 may be adjusted, as discussed previously.

The indicator 504 is designed for null indication when the responder 501 is in the null condition. Otherwise, the indicator 504 gives one of two possible signals, which one depending upon which blister, 509 or 510, is not touching its contact, 514 or 513. The signal given by the indicator 504 may be merely a warning to alert an operator that something is wrong, or it may serve to actuate an automatic control which can remedy the trouble.

Suppose that it is desired to maintain a fluid stream at a temperature $T_2$ which is $\Delta T$ degrees above the temperature $T_1$ of a reference stream. The responder 501 is constructed to be in the null condition when the sensor 503 is $\Delta T$ degrees warmer than the sensor 502. Then, the sensor 503 is placed in the stream at temperature $T_2$ and the sensor 502 is placed in the reference stream at temperature $T_1$. No matter what the temperatures $T_1$ and $T_2$ are, as long as their difference $(T_2 - T_1)$ is equal to $\Delta T$, the responder 501 will remain in the null condition. If, however, the temperature $T_2$ of the fluid stream surrounding the sensor 503 rises while the temperature $T_1$ at the sensor 502 remains steady, the pressure in the chamber 517 rises and causes the blister 510 to leave the contact 513. The indicator 504 then gives a signal to notify an operator or actuates an automatic control to cool the stream surrounding the sensor 503 or to heat the stream surrounding the sensor 502, thus bringing the responder 501 back to the null condition. If the temperature $T_2$ drops relative to $T_1$, then the blister 509 leaves the contact 514. In this case, the indicator 504 gives the other signal to notify the operator or actuates the control to heat the stream surrounding the sensor 503 or to cool the stream surrounding the sensor 502.

(b) *Use of heated sensors (FIG. 8).*—The device of FIG. 7 may be modified to provide a comparison of the rates of flow of two fluid streams past the sensors 502 and 503. The modification comprises the addition of means for heating the sensors; for example, current may be passed through them, as shown in FIG. 8. Current from a battery 530 flows through a potentiometer 531 where it divides, part going through a wire 532, the sensor 502, and the responder 501, and returning to the battery 530 via the ground lead 523. The other part of the current from the battery 530 goes through a wire 533, the sensor 503, and the responder 501, and returns to the battery 530 via the ground lead 523. The rest of the device of FIG. 8 is the same as that of FIG. 7.

The current flowing through the sensors 502 and 503 dissipates power in their resistance and heats them. If the power dissipation is constant, the equilibrium temperature of each sensor depends upon the rate at which heat is removed from it. Since a fluid in motion removes heat from an object immersed in it faster than a still fluid, the rate of heat removal being an increasing function of the fluid's velocity, the equilibrium temperatures of the sensors 502 and 503 depend upon the rate of flow of the fluids past them, as well as the initial temperatures of the fluids. The relative currents through the sensors 502 and 503 can be adjusted by means of the potentiometer 531 in order to compensate for differences in the temperatures of the two fluid streams. Thus the device of FIG. 8 is a differential-flow-rate indicator which compares the rates of flow of two fluid streams and maintains them at constant magnitudes relative to each other. One application of such a device is in a process where fluid flows into a tank from a supply and out through a drain; in order to avoid emptying or overflowing the tank, the input and outputs flows must remain equal. The device of FIG. 8 can actuate suitable controls to maintain the equality of the flow rates of the two streams.

Many variations of the forms of the invention shown in FIGS. 7 and 8 are possible without departing from the spirit and scope of the invention. For example, the quantity $\Delta T$ may be adjusted by adjusting the pressure in the anti-sensor chamber; or a single-blister responder may be used to give indication only when $T_2$ is higher (for example) than $T_1$. The omission of discussion of such variations is not intended in any way to limit the application of the principles of this invention.

(c) *Indication and control of cooling rates (FIG. 8).*—Internally heated equipment, such as electronic equipment and power-generating equipment, often must be cooled by a cooling fluid, usually gas. The amount of cooling depends upon the initial temperature of the fluid as well as the flow rate, for if the incoming fluid becomes colder, less flow is required, and if it becomes warmer, more flow is required to maintain the equipment at a safe operating temperature.

The device of FIG. 8 can be used to measure or control the relative cooling of two separate fluid streams. For example, the sensor 502 may be removed and the chamber 520 may be filled with gas at a predetermined pressure and sealed. Then the potentiometer 531 may be used to adjust the temperature in the sensor 503 until the null condition is obtained at the desired cooling condition. The indicator 504 will then show whether the cooling effect is above or below standard, and it can also be used to control the cooling as required.

For optimum operation the chamber 520 may be fully evacuated and the blister 509 designed to fully balance the desired working pressure in the chamber 519, thereby eliminating temperature errors in the reference standard. If simplicity is desired, the system may be operated with a single diaphragm 509 and the blister 510, electrode 513, tube 511, lead 515, passage 520, and sensor 502 may all be eliminated.

For such applications the sensor 503 preferably employs materials essentially impervious to gas diffusion, such as imporous ceramic, quartz, and special glass.

As brought out many times herein, I utilize molybdenum metal in novel ways. For example, the molybdenum ribbon 71 succeeds where ribbons of stainless steel, nickel, manganese, iron, aluminum, copper, etc. failed, because they reacted with zirconium, titanium, etc. to form alloys with eutectic points below the melting points of the individual metals. In the operating range herein, molybdenum solves the probelm; it does not weld to the wire 70, or plug the gas passage, or form a low-melting-point alloy, and it gets stronger instead of weaker in the presence of zirconium and titanium. Its effect on the hydrides is to shift the alpha-beta transition point favorably, i.e., to lower it. Note that FIG. 5 and others show the wire-ribbon combination in the fully ingassed state. When outgassed, the ribbon 71 is loose in the tube 72, for the wire 70 expands about 15% as a result of ingassing and contracts when outgassing.

To those skilled in the arts to which this invention relates, many changes in construction and widely differing embodiments in applications of the invention will suggest themselves without departing from the spirit and scope of the invention. The disclosures and the descriptions herein are purely illustrative and are not intended to be in any sense limiting.

I claim:

1. A differential temperature detection system comprising a diaphragm; a housing divided by said diaphragm into first and second chambers; a first tube connected to said first chamber and containing a transducing agent that releases large quantities of gas when heated; a second tube connected to said second chamber and also containing a transducing agent that releases large quantities of gas when heated; a switch in each of said first and second chambers, each actuated by said diaphragm as a result of the difference between the pressures in said first and second chambers; and an electrical circuit for said switches and actuated thereby, said circuit including an indicator actuated by said circuit.

2. The system of claim 1 wherein there are electrical means for heating each tube's transducing agent.

3. A differential temperature detection system comprising a diaphragm; a housing divided by said diaphragm into first and second chambers; a first tube connected to said first chamber and containing a transducing agent that releases large quantities of gas when heated; a second tube connected to said second chamber and also containing a transducing agent that releases large quantities of gas when heated; a switch in said second chamber and actuated by said diaphragm at a pressure difference level between chambers; an electrical circuit for said switch and actuated thereby, said circuit including an indicator actuated by said circuit; and electrical means for heating each tube's transducing agent.

4. A differential temperature detection system comprising a diaphragm; a housing divided by said diaphragm into first and second chambers; a first tube connected to said first chamber and containing a transducing agent that releases large quantities of gas when heated; a second tube connected to said second chamber and also containing a transducing agent that releases large quantities of gas when heated; an electrical switch in said second chamber and actuated by said diaphragm at a pressure difference level between chambers, resulting from a temperature difference between said tubes; and an electrical circuit for said switch and actuated thereby, said circuit including an indicator actuated by said circuit.

References Cited in the file of this patent

UNITED STATES PATENTS

| | | |
|---|---|---|
| 436,045 | McElroy | Sept. 9, 1890 |
| 1,665,381 | Siddal et al. | Apr. 10, 1928 |
| 1,781,289 | Mayo | Nov. 11, 1930 |
| 1,907,666 | Raney | May 9, 1933 |
| 1,907,869 | Raney | May 9, 1933 |
| 2,004,667 | Mautsch | June 11, 1935 |
| 2,082,134 | Alexander | June 1, 1937 |
| 2,189,147 | Mathisen | Feb. 6, 1940 |
| 2,246,536 | Reinthaler | June 24, 1941 |
| 2,274,119 | Baak | Feb. 24, 1942 |
| 2,283,374 | Kronmiller | May 19, 1942 |
| 2,484,932 | Cox | Oct. 18, 1949 |
| 2,493,351 | Jones | Jan. 3, 1950 |
| 2,551,526 | Campbell | May 1, 1951 |
| 2,566,235 | Mathisen | Aug. 28, 1951 |

(Other references on following page)

UNITED STATES PATENTS

| | | |
|---|---|---|
| 2,627,911 | McCarty et al. | Feb. 10, 1953 |
| 2,628,347 | Foster | Feb. 10, 1953 |
| 2,674,324 | Mascarini | Apr. 6, 1954 |
| 2,747,615 | Tate | May 29, 1956 |
| 2,749,993 | Gregg | June 12, 1956 |
| 2,787,130 | Kaufman | Apr. 2, 1957 |
| 2,809,140 | Smeaton | Oct. 8, 1957 |
| 2,839,086 | Engelberger | June 17, 1958 |
| 2,860,080 | Wanamaker et al. | Nov. 11, 1958 |
| 2,884,311 | Huff | Apr. 28, 1959 |
| 2,927,309 | Poitras | Mar. 1, 1960 |

FOREIGN PATENTS

| | | |
|---|---|---|
| 125,692 | Australia | Sept. 29, 1947 |